United States Patent [19]

Fujita et al.

[11] Patent Number: 4,672,187
[45] Date of Patent: Jun. 9, 1987

[54] FOCUSING ERROR DETECTING DEVICE IN HEAD ASSEMBLY FOR OPTICAL DISC

[75] Inventors: Teruo Fujita; Keizo Kono; Mitsushige Kondo; Shinsuke Shikama, all of Kyoto, Japan

[73] Assignee: Mitsubishi Denki Kabushiki Kaisha, Tokyo, Japan

[21] Appl. No.: 787,782

[22] Filed: Oct. 15, 1985

[30] Foreign Application Priority Data

Oct. 16, 1984 [JP] Japan .................. 59-216751
Apr. 10, 1985 [JP] Japan .................. 60-75877

[51] Int. Cl.$^4$ .................. G01J 1/20; G01J 1/30; H01J 3/14
[52] U.S. Cl. .................. 250/201; 250/237 G; 369/45
[58] Field of Search .................. 250/201 AF, 201 DF, 250/204, 237 G; 369/45, 46, 44

[56] References Cited

FOREIGN PATENT DOCUMENTS 0130448 8/1983 Japan .................. 369/45

Primary Examiner—Eugene R. LaRoche
Assistant Examiner—David Mis
Attorney, Agent, or Firm—Bernard, Rothwell & Brown

[57] ABSTRACT

A focusing error detecting device used in a head assembly for recording information to a recording surface of an optical disc or reading out information already recorded, the focusing error detecting device including a diffraction grating for focusing light which has been introduced from a light source into a thin-film waveguide layer, onto the recording surface, and two light receiving diffraction gratings for conducting the light reflected by the recording surface again into the waveguide layer. The two light receiving diffraction gratings have optical characteristics which differ from each other, depending the position of a focused spot of the light focused on the recording surface by the focusing diffraction grating. Therefore, by comparing the intensity of light from one light receiving diffraction grating with that from the other light receiving diffraction grating, there can be seen a positional relationship between the focused spot and the recording surface.

14 Claims, 45 Drawing Figures

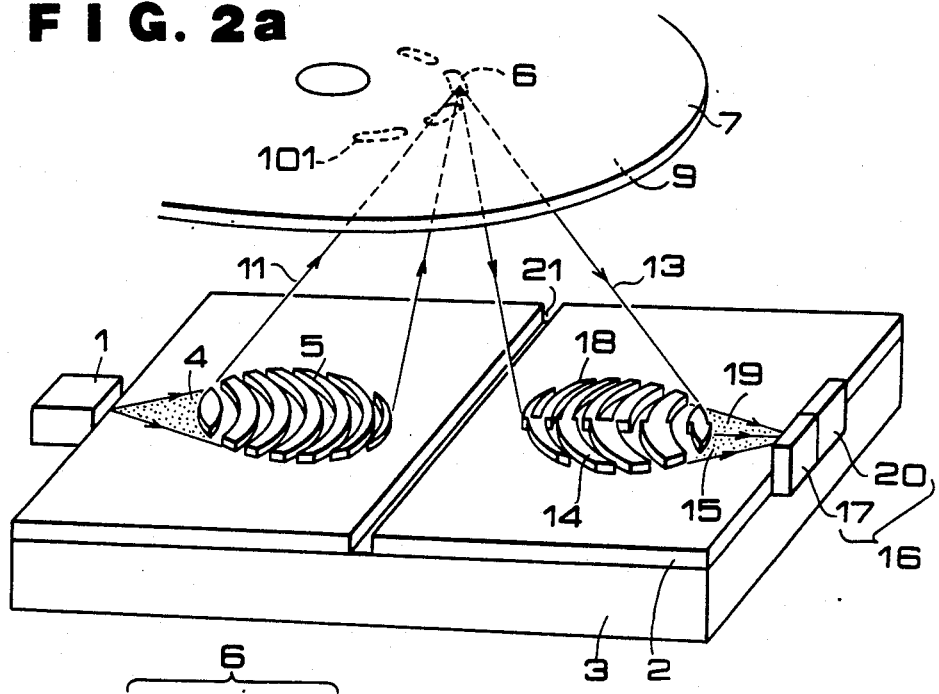
F I G. 2a
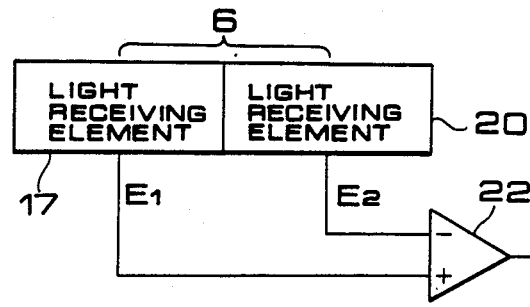
F I G. 2b
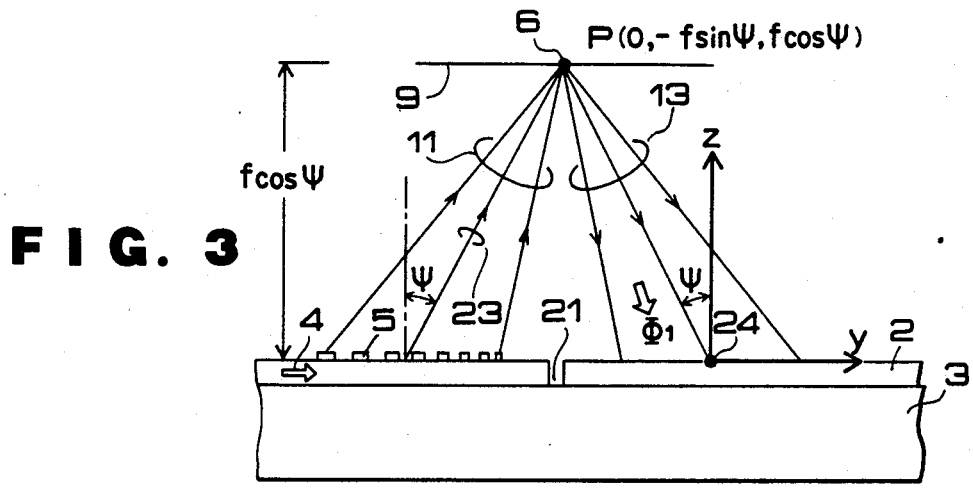
F I G. 3

F I G. 4a
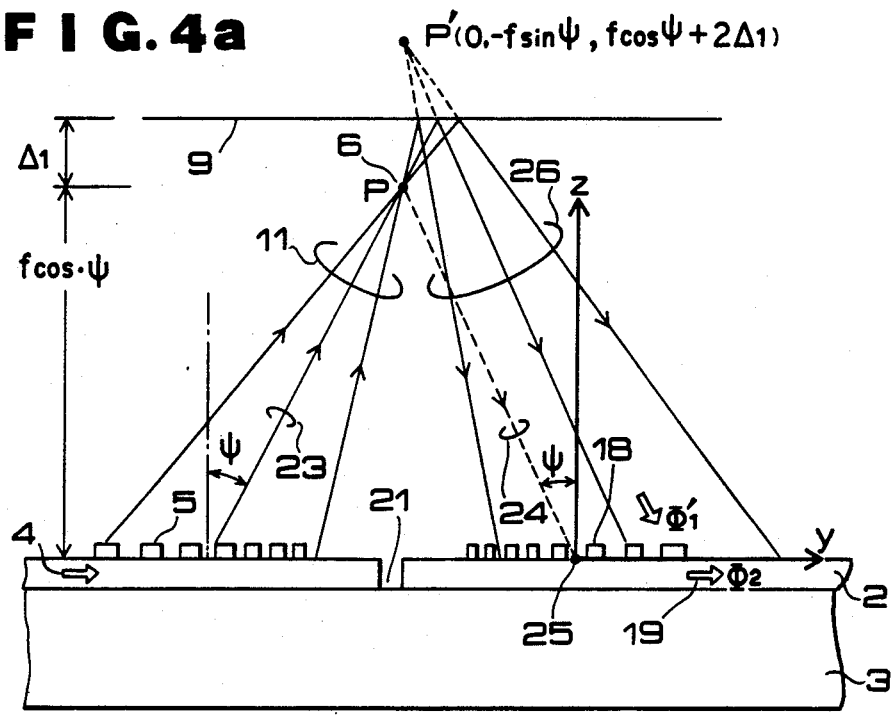
F I G. 4b
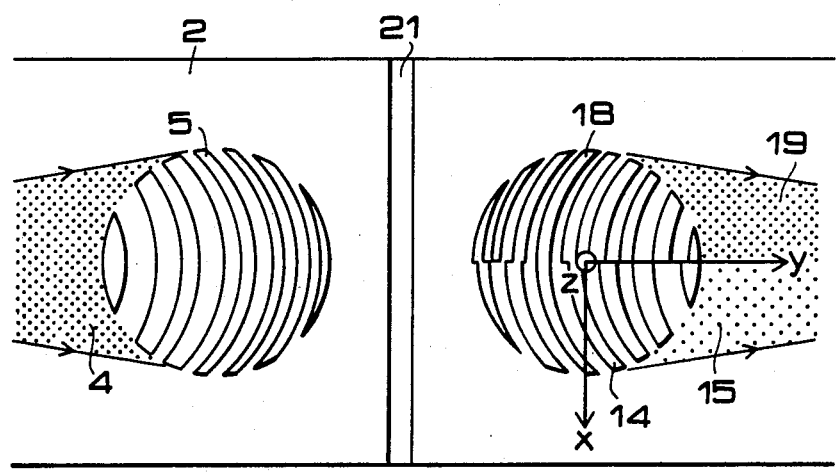

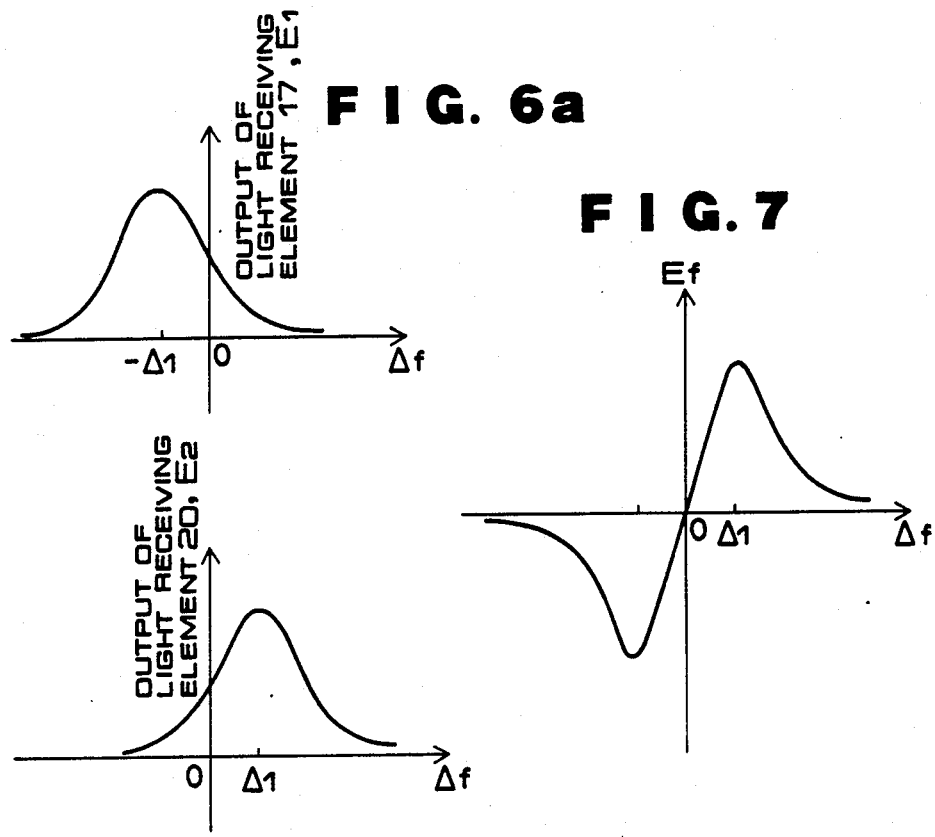
FIG. 6a
FIG. 7
FIG. 6b
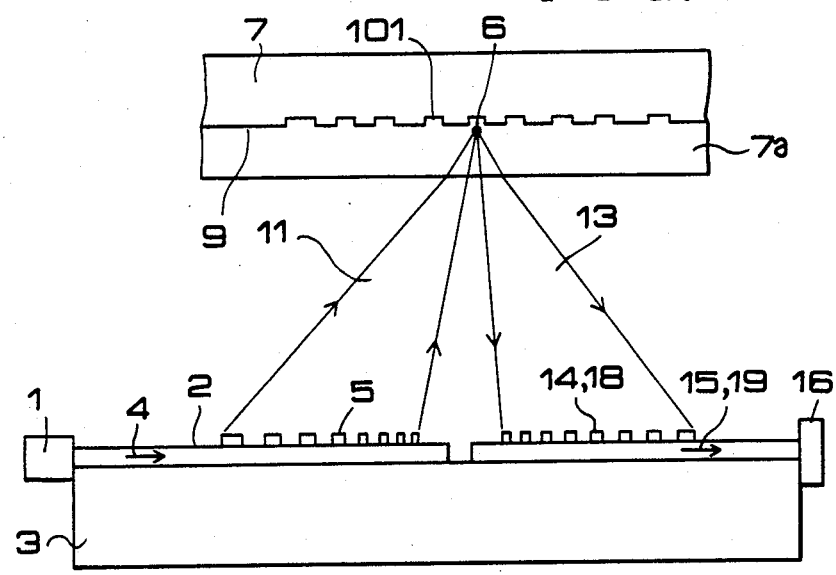
FIG. 8

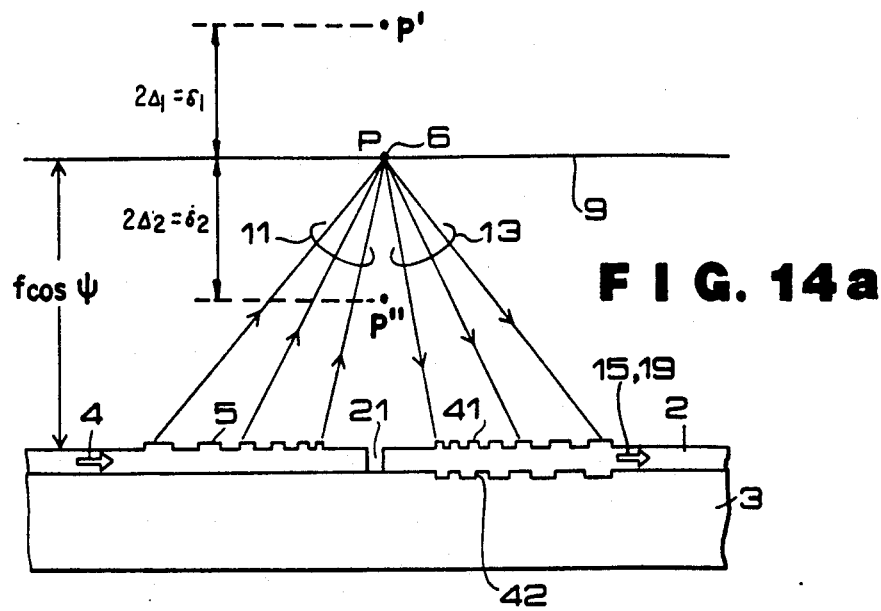
F I G. 14a
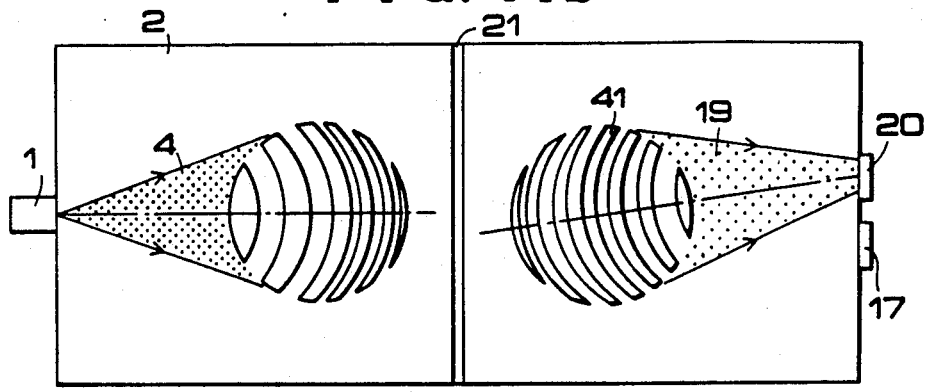
F I G. 14b
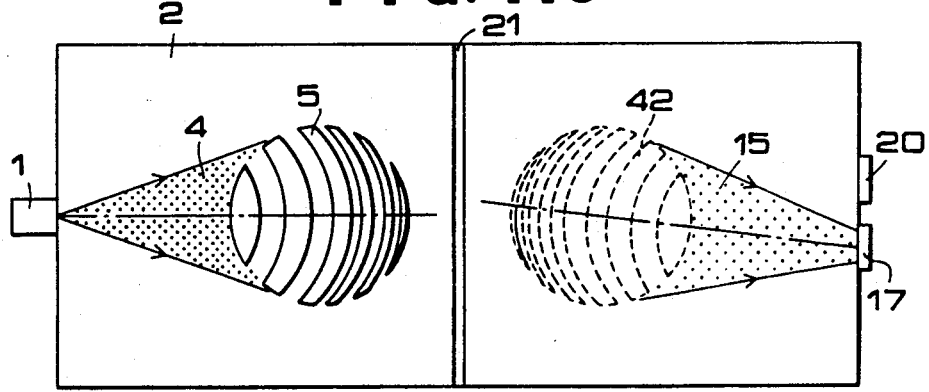
F I G. 14c

FOCUSING ERROR DETECTING DEVICE IN HEAD ASSEMBLY FOR OPTICAL DISC

BACKGROUND OF THE INVENTION

1. Field of the Invention

The present invention relates to a focusing error detecting device in an optical head assembly for reading or writing information from or to an information recording medium such as an optical disc. Particularly, it is concerned with a focusing error detector in an optical head using optical waveguides.

2. Description of the Prior Art

FIGS. 1(a) and (b) illustrate a construction of a conventional optical pickup using a optical waveguide disclosed in Japanese Laid-Open Application No. 130448/83. In these figures, the reference numeral 1 denotes a light source, e.g. a semiconductor laser, and the numeral 2 denotes a optical waveguide layer formed by a dielectric thin film on a substrate 3. Guided beam emitted from the light source 1 and propagated through the optical waveguide layer 2 is taken out into space and converged to a focused spot 6 by means of a first diffraction grating 5. The numeral 7 denotes an information recording medium such as an optical disc; numeral 8 denotes a second diffraction grating provided on the back of the substrate 3 for conducting a reflected beam from an information recording surface 9 of the information recording medium 7 to a photo detector 10; and numeral 11 denotes a converged spherical wave.

The first diffraction grating 5 is for converting a guided beam 4 propagated through the thin-film optical waveguide layer 2 into the converged spherical wave 11 at the focused spot 6. The pattern of the diffraction grating 5 is determined from a difference in phase between the converged spherical wave 11 on the thin-film waveguide layer 2 and the guided beam 4 on the same layer. The diffraction grating 5 is named a focusing grating coupler (FGC) in view of its function and is reported in Heitmann et al., "Calculation and Experimental Verification of Two-Dimensional Focusing Grating Coupler", IEEE Journal of Quantum Electronics, QE-17, pp. 1257-1263 (1981), and also in Matsuoka, Suhara, Nishihara and Koyama, "Focusing Grating Coupler by Electron Beam Drawing", Research Meeting Report MW83-88, Institute of Electronics and Communication Engineers of Japan, pp. 47-54 (1983). Part of the light reflected from the information recording medium 9 passes through the thin-film waveguide layer 2 and the substrate 3 and reaches the back of the substrate. The second diffraction grating 8 functions as both a cylindrical lens and a converging lens, and it creates an astigmatism on the transmitted wavefront. As to this diffraction grating lens, the inventors in the Japanese laid-open application No. 130448/83 make report in Applied Physics Society Biannual Meeting - Draft Lectures, 26p-s-5, p. 170 (autumn 1983). In the figures, a reflected beam 12 having astigmatism is conducted to the photo detector 10, whereby a focusing error and a tracking error can be detected by an astigmatism method and a push-pull method which utilizes bisection of beam.

Thus, in the optical head assembly shown in FIG. 1, the processing for the reflected beam for focusing error and tracking error detection is performed by the photo detector 10 which is disposed spatially away from the optical waveguide layer 2. Consequently, it is necessary to make a triaxial adjustment of the photo detector 10, which makes it impossible to attain the reduction in size of the optical head.

SUMMARY OF THE INVENTION

It is an object of the present invention to provide a novel focusing error detecting device capable of facilitating an optical axis adjustment for a focusing error detector, attaining reduction in size and thickness of an optical head and suitable for an optical head using optical waveguide.

The focusing error detecting device of the present invention is provided with at least two diffraction gratings for receiving a reflected light from an information surface and causing it to be guided again in a thin-film waveguide layer, on or within the waveguide layer or at an interface between the waveguide layer and a substrate, in which a focusing error detecting and signal detecting photo detector is mounted in the thin-film waveguide layer or at an end face of the same layer.

In the present invention, since the photo detector is provided in the thin-film waveguide layer or at an end face of the same layer, it is possible to attain reduction in size and thickness of an optical head, and an optical axis adjustment for the photo detector becomes easy because the photo detector, diffraction gratings, etc. can be formed on the same substrate.

It is another object of the present invention to provide a focusing error detecting device capable of facilitating an optical axis adjustment for a focusing error detector, attaining reduction in size and thickness of an optical head, being suitable for an optical head using optical waveguides and capable of obtaining a correct focusing error signal even when a variation in intensity distribution occurs in a section of a reflected beam from an information recording surface.

In another aspect of the present invention, the focusing error detecting device is of a construction in which, according to a vertical displacement of a focused spot of light beam focused by a focusing diffraction grating relative to an information recording surface, a reflected beam from the information recording surface is converted to a guided beam at a maximum conversion efficiency by one of two light receiving diffraction gratings provided opposedly on the surface and the back of a waveguide layer formed by a thin film, and a focusing error detection is performed on the basis of such guided beam by means of a photo detector provided in the thin-film waveguide layer.

Thus, in the present invention, since two diffraction gratings for receiving a reflected light beam from an information surface and a photo detector for detecting a focusing error on the basis of a guided beam from each of the two diffraction gratings are integrally provided in a thin-film optical waveguide, it is possible to attain reduction in size and thickness of an optical head, and a semiconductor laser, photo detector and diffraction gratings can be formed on the same substrate, thereby facilitating an optical axis adjustment for the photo detector, and a correct focusing error signal can be obtained even when a variation in intensity distribution occurs in a section of a reflected light beam.

BRIEF DESCRIPTION OF THE DRAWINGS

FIG. 2(a) is a perspective view showing an optical arrangement of a head assembly for an optical disc according to the present invention and FIG. 2(b) is a circuit diagram of a circuit for processing output signals from two photo detectors in the head assembly of FIG. 2(a);

FIG. 3 is a side view showing a light beam advancing path between the head assembly of FIG. 2(a) and a information recording surface, when a focused spot exists on the recording surface;

FIG. 4(a) is a view similar to FIG. 3, showing the focused spot not coincident with the recording surface and FIG. 4(b) is a plan view showing shapes of two diffraction gratings for receiving a reflected light;

FIGS. 6(a) and (b) are graphs showing relations between the magnitude of focused spot deviation and output levels of two light receiving elements;

FIG. 7 is a graph showing changes in output signal level of a differential amplifier in FIG. 2(b) relative to changes in the position of a focused spot;

FIG. 8 is a view similar to FIG. 3, in which an optical disc has a transparent protective layer formed on its recording surface;

FIGS. 13(a)-(c), 14(a)-(c), 15(a)-(c) and 16(a)-(c) are views similar to FIGS. 12(a)-(c), showing recording surface - focused spot relations different from that shown in FIG. 12(a);

DETAILED DESCRIPTION OF THE PREFERRED EMBODIMENTS

Figure 1A:
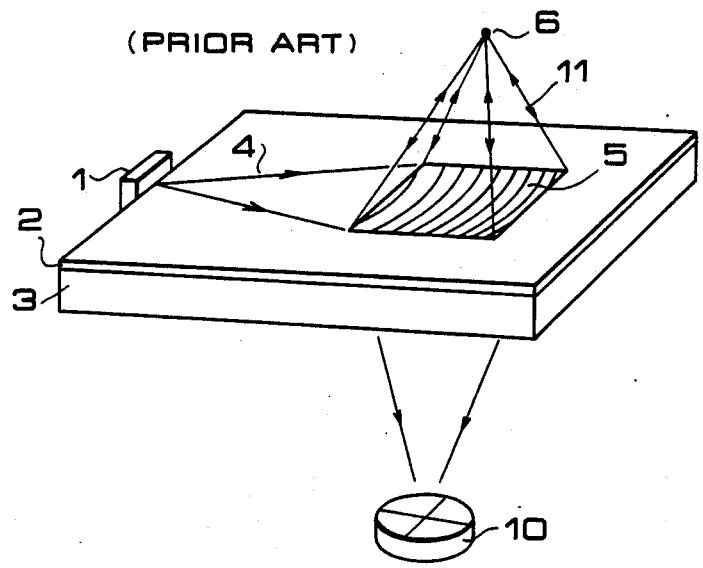
FIG. 1 (a) is a perspective view showing an optical arrangement of a conventional head assembly for an optical disc and FIG. 1(b) is a side view thereof.
Figure 1B:
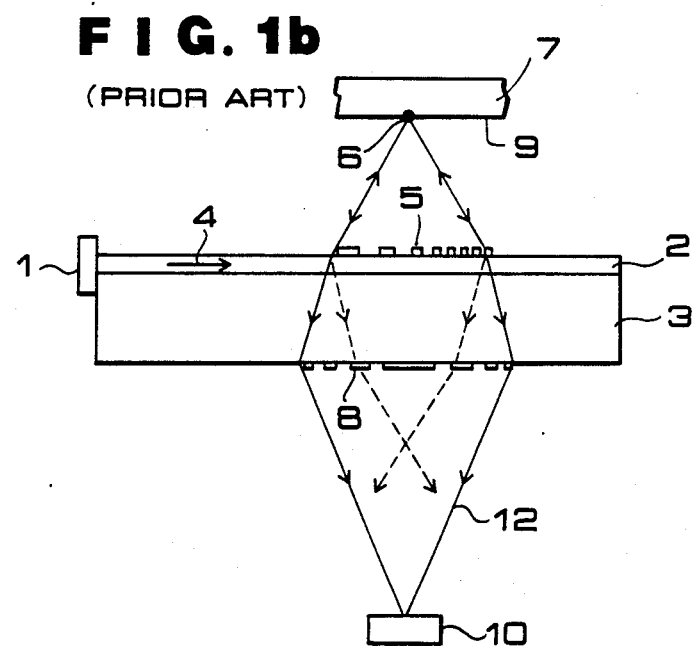

Referring to FIGS. 2(a) and (b), there is illustrated a construction of a focusing error detecting device according to a first embodiment of the present invention, in which the numerals 1 to 7 and 11 indicate portions corresponding to those in the conventional device of FIG. 1. The numeral 101 denotes an information pit formed on an information recording surface 9; numeral 13 denotes a reflected light beam from the information recording surface; numeral 14 denotes a light receiving diffraction grating for converting a part of the reflected beam 13 again into a guided beam 15 and conducting it to one light receiving element 17 of a bisplit photo detector 16; and numeral 18 denotes a light receiving diffraction grating for converting the remaining part of the reflected beam 13 into a guided beam 19 and conducting it to the other light receiving element 20. Optical characteristics of the diffraction grating 14 are designed so that when the information recording surface 9 is located below the focused spot 6, the conversion efficiency from the reflected beam 13 to the guided beam 15 becomes maximum, while optical characteristics of the diffraction grating 18, contrary to the diffraction grating 14, are designed so that when the information recording surface 9 is located above the focused spot 6, the conversion efficiency from the reflected beam 13 to the guided beam 19 becomes maximum. Therefore, as shown in FIG. 2(b), a differential amplifier 22 is used to obtain a differential output between the outputs of the light receiving elements 17 and 20, whereby it becomes possible to obtain a focusing error signal $E_f$. Further, the thin-film waveguide layer 2 is formed with a notch 21. The notch 21 is provided for preventing the guided beam portion which has not been converted to the converged spherical wave 11 by the diffraction grating 5, from entering the waveguide layer on the light receiving side.

A detailed explanation will now be made about the shapes of the light receiving diffraction gratings 14 and 18 with reference to FIGS. 3 and 4. FIG. 3 shows the state of light beam in the absence of a focusing error, in which the converged spherical wave 11 which has been taken out from the waveguide layer 2 by the diffraction grating 5 is focused to the focused spot 6 and then reflected by the information recording surface 9 into a divergent spherical wave 13. If the angle between a principal ray 23 of the converged spherical wave 11 and a normal raised on the waveguide layer 2 is $\psi$, the spacing between the waveguide layer 2 and the information recording surface 9 is $f \cos \psi$, and if the waveguide layer 2 and the information recording surface 9 are parallel with each other and a point 24 at which the principal ray 23 is again incident on the waveguide layer 2 after being reflected by the information recording surface 9 is chosen as a coordinate origin, then the coordinates of the focused spot 6 are expressed as P(0, $-f \sin \psi$, $f \cos \psi$) and the phase $\phi_1$ of the divergent spherical wave 13 on the waveguide layer 2 is given as:

$$\phi_1 = \frac{2\pi}{\lambda} \sqrt{x^2 + (y + f \sin \psi)^2 + (f \cos \psi)^2} \quad (1)$$

$\lambda$: wavelength in air of the light source.

On the other hand, FIG. 4(a) shows the state of light beam in the presence of a focusing error. As shown, when the information recording surface 9 is spaced above from the focused spot 6 by $\Delta_1(>0)$, a reflected light beam 26 from the information recording surface 9 can be expressed as a spherical wave divergent from a point P' (0, $-f\sin\psi$, $f\cos\psi+2\Delta_2$). Thus, the phase $\phi_1'$ of the reflected beam 26 on the waveguide layer 2 is given as:

$$\phi_1' = \frac{2\pi}{\lambda} \sqrt{x^2 + (y + f\sin\psi)^2 + (f\cos\psi + 2\Delta_1)^2} \qquad (2)$$

If the phase of the guided beam 19 to be coupled is $\phi_2(x, y)$, a group of curves which satisfy the following give a two-dimensional shape of the diffraction grating 18:

$$\Delta\phi = \phi_1' - \phi_2 = 2m\pi + \text{constant (m: integer)} \qquad (3)$$

The diffraction grating 18 excites the guided beam 19 most strongly when the divergent spherical wave 26 from the point P' is incident thereon (an element for converting a light beam propagated in a space into a guided beam by the use of a diffraction grating is described in some literatures and well known in this field). The shape of the diffraction grating 14 is obtained by substituted $-\Delta_1$ for $\Delta_1$, contrary to the diffraction grating 18.

The focusing error detecting device constructed as above operates in the following manner. When the information recording surface 9 is spaced above the focused spot 6 by $\Delta_1$, as shown in FIG. 4(a), the reflected light beam 26 from the information recording surface 9 is converted to the guided beam 19 at the highest efficiency by the diffraction grating 18. But, the excitation of the guided beam 15 is weak in the state of FIG. 4(a) because the diffraction grating 14 is so designed as to convert the reflected light beam to the guided beam 15 most efficiently when the information recording surface 9 is spaced below the focused spot 6 by $\Delta_1$.

Figure 5A:
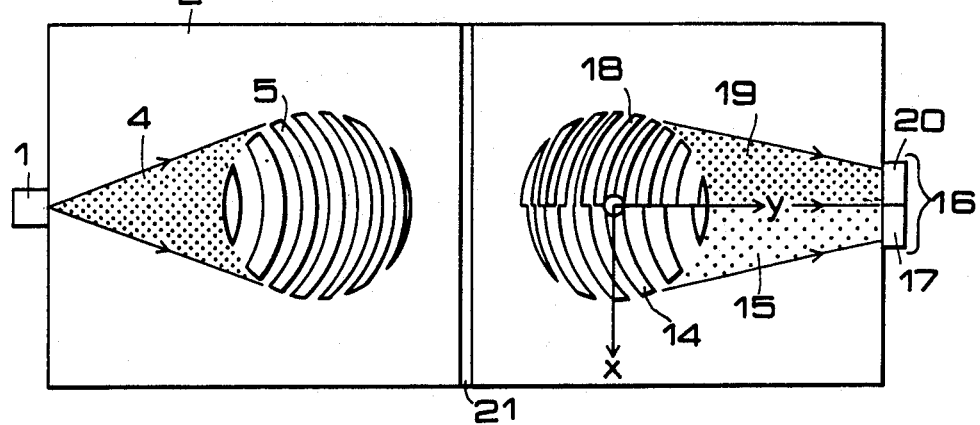
FIGS. 5(a) to (c) show conversion efficiencies relative to changes in the position of a focused spot, in terms of dot densities.

Therefore, the quantity of light incident on the light receiving element 20 of the bisplit photo detector 16 increases, as shown in FIG. 5(a).

Figure 5B:
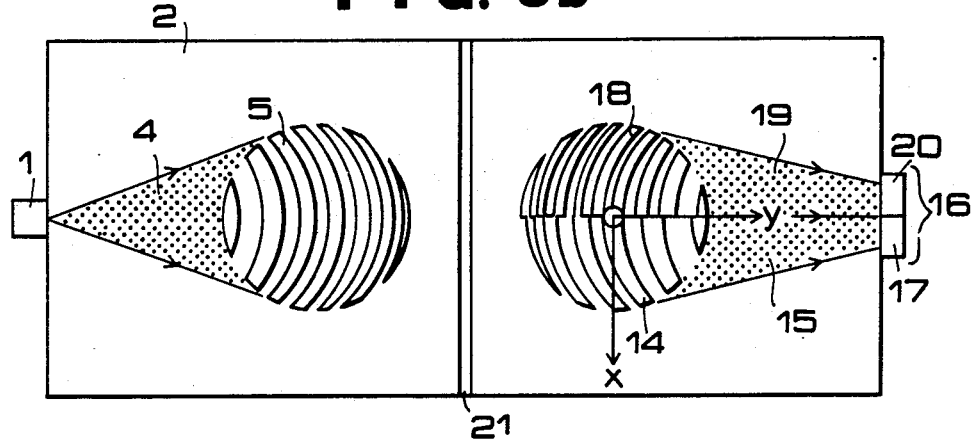

When the focused spot 6 is on the information recording surface 9, the coupling of the reflected beam 26 to the guided beam 15 and that to the guided beam 19 are both incomplete, but the deviations are about the same. Consequently, as shown in FIG. 5(b), the guided beams 15 and 19 are excited at about the same intensity, and the quantities of light incident on both light receiving elements 17 and 20 of the bisplit photo detector 16 become almost equal.

Figure 5C:
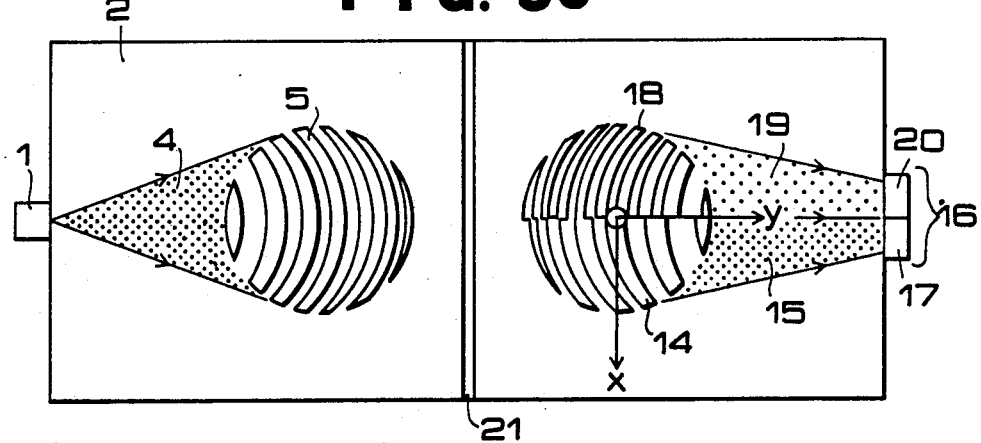

Further, when the information recording surface 9 approaches the substrate 3 and is spaced below the focused spot 6 by $\Delta_1$, the guided beam 15 is excited most strongly by the reflected beam 26 and the quantity of light incident on the light receiving element 17 becomes maximum [FIG. 5(c)].

FIGS. 6(a) and (b) show outputs of the light receiving elements 17 and 20 of the bisplit photo detector 16 relative to a focusing error $\Delta f$. By taking a difference between these two outputs, there can be obtained such a focusing error signal $E_f$ as shown in FIG. 7.

Although in the above embodiment the information recording surface 9 is present on the surface of the information recording medium 7, it is apparent that the same focusing error detecting device can be constituted even when the information recording surface 9 is covered with a transparent protective layer 7a as shown in FIG. 8.

Figure 9A:
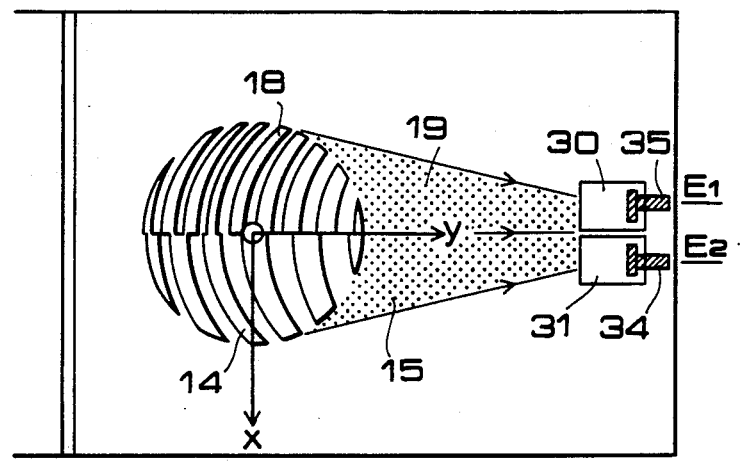
FIG. 9(a) is a plan view of a part of a head assembly having two photo detectors disposed in a optical waveguide which is formed by thin film and FIG. 9(b) is a sectional view thereof.
Figure 9B:
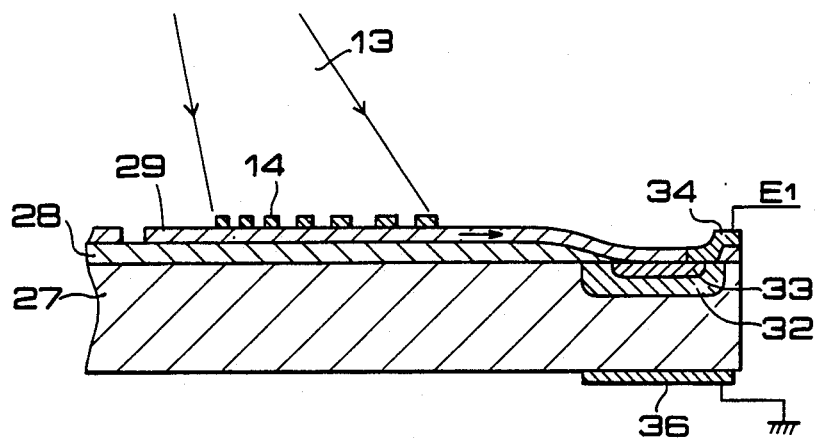

Moreover, although in the above embodiment the bisplit photo detector is attached to an end face of the thin-film waveguide layer, it may be provided in the waveguide layer as shown in FIG. 9. In order to integrate the photo detector with the waveguide layer, it is suitable to use a semiconductor material such as Si or GaAs as the substrate material. FIG. 9 shows an example of integration of a PiN photodiode as the photo detector, using an n-Si substrate, in which the numeral 27 denotes an n-Si substrate, numeral 28 denotes an $SiO_2$, layer, numeral 29 denotes a thin-film waveguide layer, numerals 30 and 31 denote PiN photodiodes, numeral 32 denotes an i layer, numeral 33 denotes a P layer, and numerals 34, 35 and 36 denote electrodes. Such a photo detector provided in the optical waveguide is as reported, for example, in D. Ostrowsky et al., "Integrated Optical Photodetector", Appl. Phys. Lett., 29, p. 463 (1973).

Further, although in the above embodiment the semiconductor laser 1 is attached to an end face of the waveguide layer, such diffraction gratings and photo detector may be integrated directly in the waveguide layer of the semiconductor laser itself.

Figure 10A:
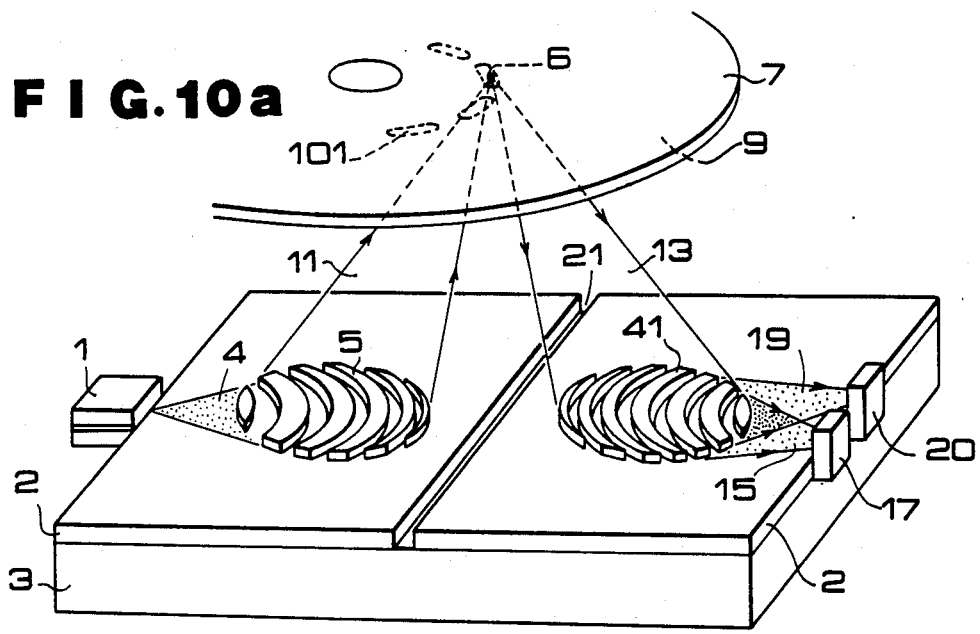
FIG. 10(a) is a perspective view of another head assembly according to the present invention.
Figure 10B:
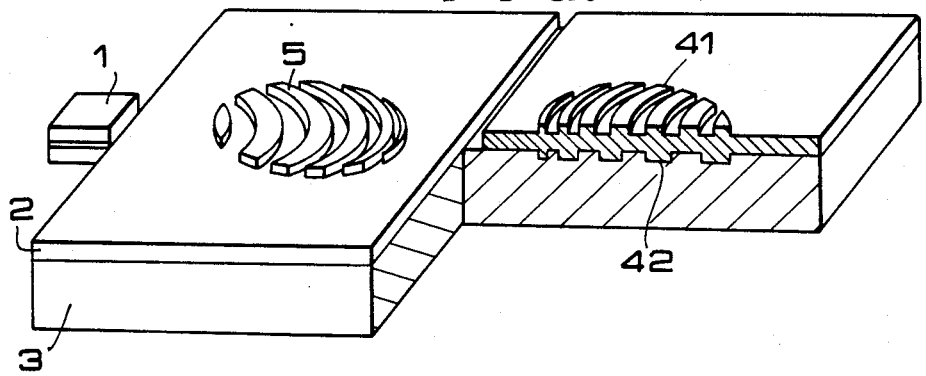
FIG. 10(b) is a partially cut-away perspective view thereof and Fig. 10(c) is a perspective view of the head assembly, where the waveguide layer is partially removed to let a second diffraction grating appear.
Figure 10C:
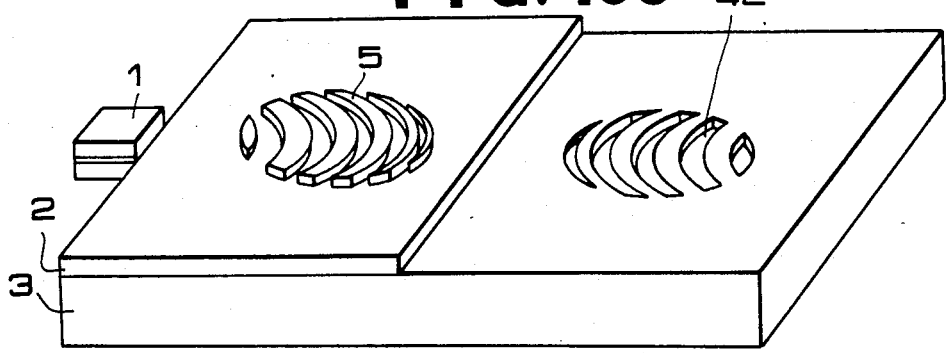

Referring now to FIG. 10, there is illustrated a modified focusing error detecting device according to the present invention. FIG. 10(a) is an entire perspective view of this embodiment; FIG. 10(b) is a sectional view of light receiving diffraction gratings used in this embodiment; and FIG. 10(c) is an arrangement view of a second light receiving diffraction grating. In these figures, the reference numerals 1 to 7 and 11 are the same as those shown in FIG. 2. The focusing error detecting device in an optical head assembly of this embodiment is of a construction in which a reflected light beam 13 from an information recording surface 9 is converted to a guided beam at a maximum conversion efficiency by either a first light receiving diffraction grating 41 or a second light receiving diffraction grating 42 which are provided oppositely on the surface and the back of the waveguide layer 2, according to a vertical displacement of the light beam spot 6 focused by the focusing diffraction grating 5 relative to the information recording surface 9, and on the basis of the said guided beam there is performed a focusing error detection by photo detectors 17 and 20 attached to the waveguide layer 2.

In FIG. 10(a), the numeral 101 denotes an information pit on the information recording surface 9. The first light receiving diffraction grating 41 is for converting the reflected beam 13 again into a guided beam and conducting it to the photo detector 20. It is formed as a relief-like diffraction grating having an uneven sectional shape formed on the optical waveguide 2.

On the other hand, the second light receiving diffraction grating 42 is shown in FIGS. 10(b) and (c) for converting the reflected beam 13 into another guided beam 15 and conducting it to the photo detector 17. It is formed unevenly at the interface of the waveguide layer 2 and the substrate 3. The first light receiving diffraction grating 41 is designed so that the conversion efficiency from the reflected beam 13 to the guided beam 19 becomes maximum when the information recording surface 9 is located above the focused spot 6, while the second light receiving diffraction grating 42 is designed so that the conversion efficiency from the reflected beam 13 to the guided beam 15 becomes the highest when the information recording surface 9 is located below the focused spot 6, contrary to the first light receiving diffraction grating 41.

Therefore, the differential amplifier 22 is used as shown in FIG. 2(b) to obtain a differential output between the outputs of the photo detectors 17 and 20, whereby it becomes possible to take out a focusing error signal $E_f$. Further, the waveguide layer 2 is formed with a notch 21 to prevent the guided beam portion which has not been converted to the converged spherical wave by the first diffraction grating 5, from entering the waveguide layer 2 on the light receiving side.

A detailed explanation will now be made about the shapes of the first and second light receiving diffraction gratings 41 and 42 with reference to FIGS. 11 and 12. The state of light beam in the absence of a focusing error is the same as that shown in FIG. 3. In FIG. 3, the converged spherical wave 11 which has been taken out from the thin-film waveguide layer 2 by the diffraction grating 5 is focused as the focused spot 6 and then reflected by the information recording surface 9 into a divergent spherical wave 13. If the angle between a principal ray 23 of the converged spherical wave 11 and a normal raised on the waveguide layer 2 is $\psi$ and the spacing between the waveguide layer 2 and the information recording surface 9 is $f \cos \psi$, and if the waveguide layer 2 and the information recording surface 9 are parallel with each other, and if a point 24 at which the principal ray 23 is again incident on the waveguide layer 2 after being reflected by the information recording surface 9 is chosen as a coordinate origin and the upper surface of the waveguide layer 2 and a normal which includes the incident point 24 are plotted along y and z axes, respectively, then the coordinates of the focused spot 6 are expressed as $P(0, -f \sin \psi, f \cos \psi)$ and the phase $\Phi_1$ of the divergent spherical wave 13 on the waveguide layer 2 is given by the foregoing equation (1).

On the other hand, when the information recording surface 9 is spaced above from the focused spot 6 by $\Delta_1$ ($>0$), as shown in FIG. 4, a reflected beam 26 from the information recording surface 9 can be expressed as a spherical wave divergent from point $P'(0, -f \sin \psi, f \cos \psi + 2\Delta_1)$. Therefore, the phase $\Phi_1'$ of the reflected beam 26 on the waveguide layer 2 is given by the foregoing equation (2).

The first light receiving diffraction grating 41 functions to convert the reflected light beam 26 into the guided beam 19 advancing toward the photo detector 17, so if phase of the guided beam 19 is $\Phi_2(x, y)$, a group of curves which satisfy the foregoing equation (3) give a two-dimensional shape of the first light receiving diffraction grating 41 in the waveguide layer. More specifically, the shape of the "m"th curve as a constituent of the first light receiving diffraction grating 41 is given as a locus of (x, y) satisfying the equation (3). In the first diffraction grating 41, the guided beam 19 is excited most strongly when the divergent spherical wave from the point P' is incident on the diffraction grating 41.

Figure 11A:
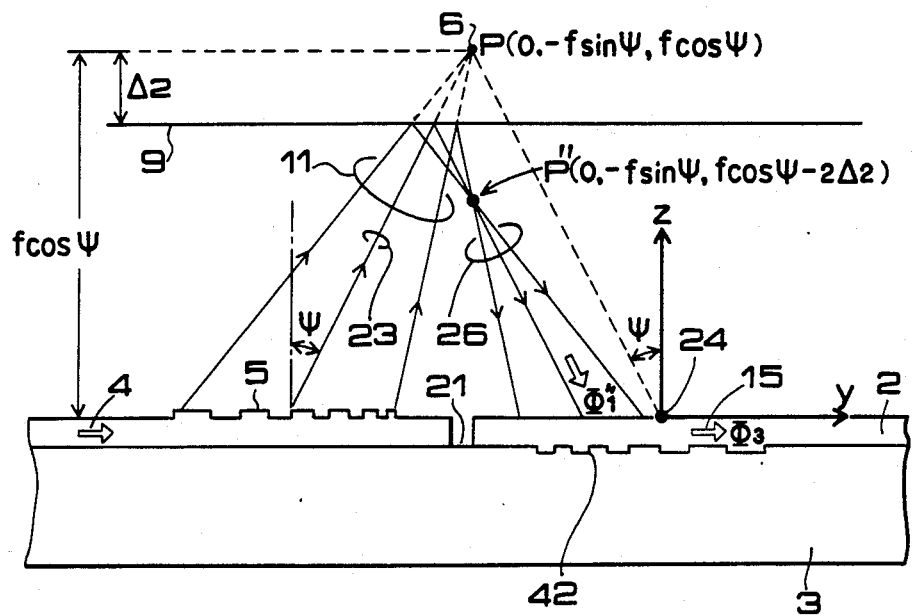
FIG. 11(a) is a side view showing a relation between a focused spot of a FGC and a light beam advancing path and FIG. 11(b) is a plan view thereof.
Figure 11B:
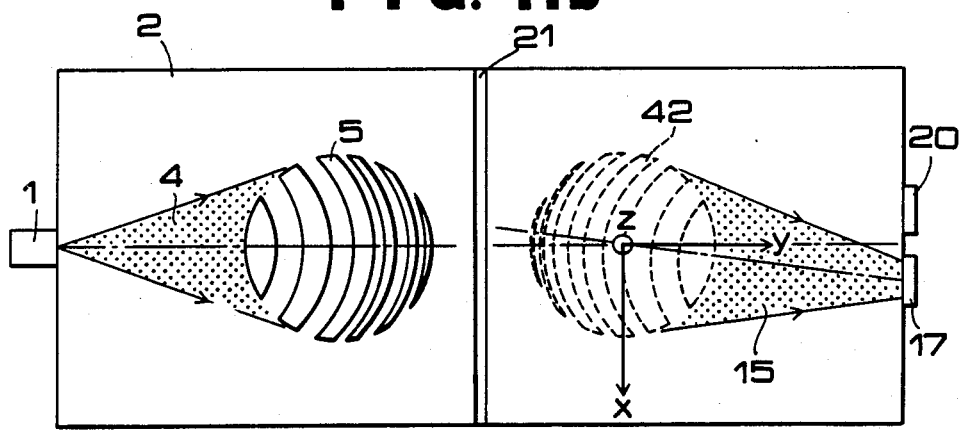
Figure 12A:
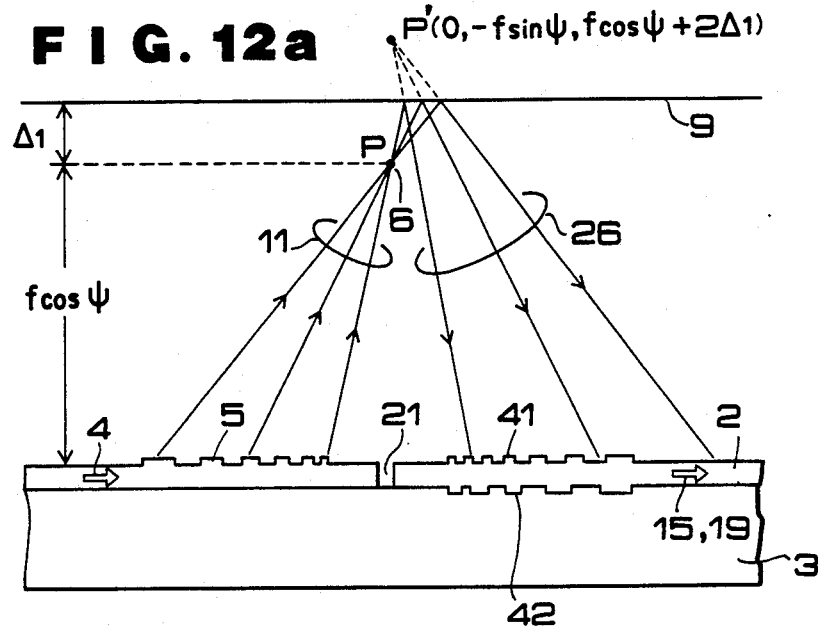
FIG. 12(a) is a view similar to FIG. 11(a) except that the recording surface - focused spot relation is different and FIGS. 12(b) and (c) are plan views showing effects of conversion by two light receiving diffraction gratings in the state of FIG. 12(a)
Figure 12B:
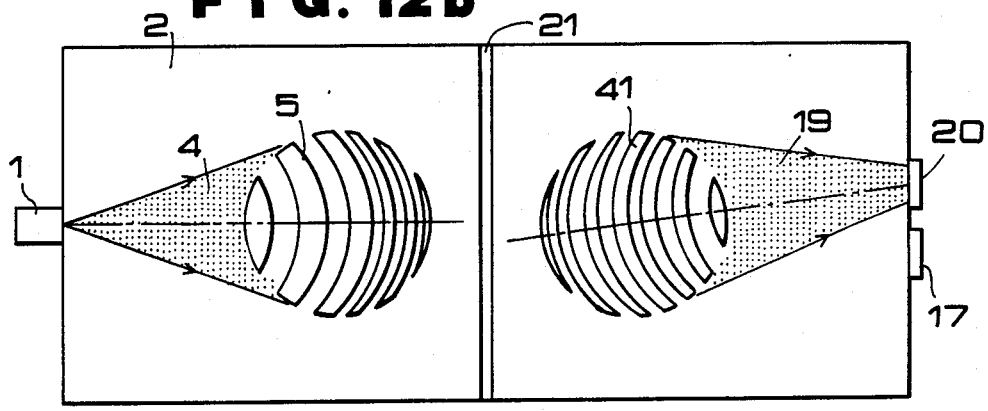
Figure 12C:
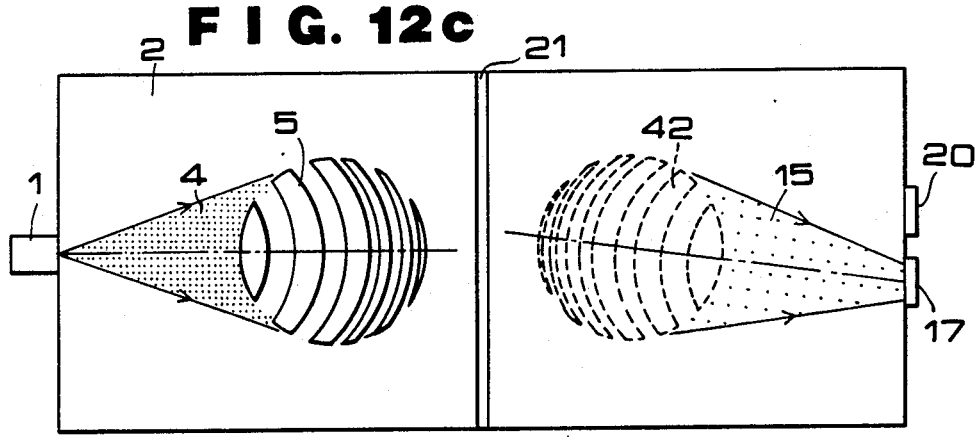

Further, when the information recording surface 9 is spaced below the focused spot 6 by $\Delta_2$ ($\simeq\Delta_1$) as shown in FIG. 11, the reflected beam 26 from the information recording surface 9 can be expressed as a spherical wave divergent from point $P''(0, f \sin \psi, f \cos \psi - 2\Delta_2)$, and the phase $\Phi''$ of the reflected beam 26 on the waveguide layer 2 is given as:

$$\phi_1'' = \frac{2\pi}{\lambda} \sqrt{x^2 + (y + f \sin \psi)^2 + (f \cos \psi - 2)^2} \quad (4)$$

The second light receiving diffraction grating 42 functions to convert the reflected beam 26 into the guided beam 15 advancing toward the photo detector 17, and if the phase of the guided beam 15 is $\Phi_3(x, y)$, a group of curves which satisfy the following give a two-dimensional shape of the second light receiving diffraction grating 42 in the plane of the waveguide layer:

$$\Delta\Phi' = \Phi_1'' - \Phi_3 = 2n\pi + \text{constant} \; (n: \text{integer}) \quad (5)$$

The second light receiving diffraction grating 42 excites the guided beam 15 most strongly when the divergent spherical wave from the point P'' is incident thereon.

Although the diffraction gratings 41 and 42 used in this embodiment are relief type diffraction gratings, there may be produced a refractive index distribution in the thin-film waveguide layer 2 to form diffraction gratings 5, 41 and 42.

The operation of the thus-constructed focusing error detecting device will now be explained with reference to FIGS. 12, 13, 14, 15, 16, 17 and 18. Referring first to FIG. 12, the information recording surface 9 is spaced above the focused spot 6 by $\Delta_1$ ($>0$), that is, the center of divergence of the reflected light beam is located at point $P'(0, -f \sin \psi, f \cos \psi - 2\Delta_1)$. At this time, the conversion efficiency $\eta_1$ from the reflected light beam 26 to the guided beam 19 by the first light receiving diffraction grating 41 becomes maximum, as previously explained in connection with FIG. 4. On the other hand, the second light receiving diffraction grating 42 is designed so that when the information recording surface 9 is spaced below the focused spot 6 by $\Delta_2(>0)$, that is, when the center of divergence of the reflected beam 26 as a divergent spherical wave is at point $P''(0, -f \sin \psi, f \cos \psi - 2\Delta_2)$, the conversion efficiency from the reflected beam to the guided beam 15 becomes maximum. Since the center of divergence of the reflected beam 26 is spaced from the point P'' by $\delta_2 = 2\Delta_1 + 2\Delta_2$, the wavefront of the reflected beam 26 on the waveguide layer 2 is different from that of the spherical wave divergent from the point P''. Therefore, the conversion efficiency $\eta_2$ from the reflected beam 26 to the guided beam 15 by the second light receiving diffraction grating 42 is low. FIG. 18 shows outputs $E_1$ and $E_2$ of the photo detectors 17 and 20 which convert the intensities of the guided beams 15 and 19 into electrical signals. It is seen that when $\Delta f$ is $\Delta_1$, $E_1$ becomes maximum while $E_2$ is very small, as shown in FIG. 18.

Figure 13A:
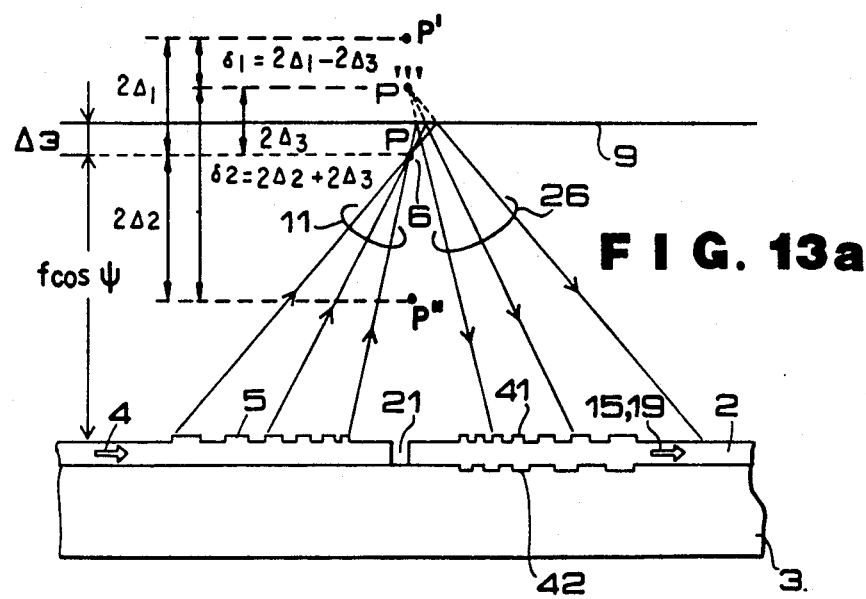
Figure 13B:
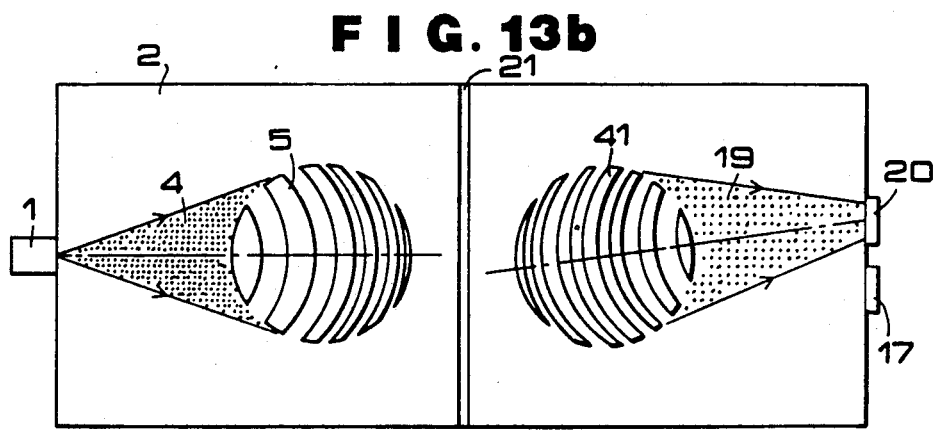
Figure 13C:
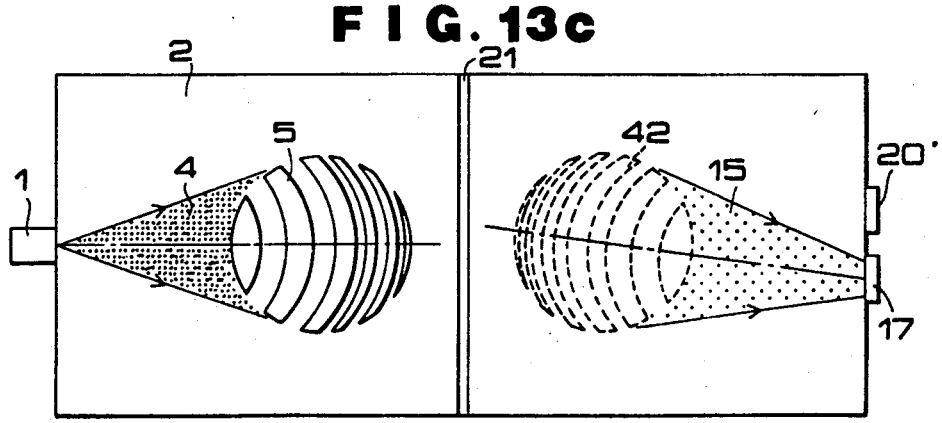

Referring now to FIG. 13, an explanation will now be made about the case where the information recording surface 9 is spaced ($\Delta_f = \Delta_3$) above the focused spot 6 by $\Delta_3$ ($\Delta_1 > \Delta_3 > 0$), that is, the case where the center of divergence of the reflected beam 26 is at point $P'''(0, -f \sin \psi, f \cos \psi + 2\Delta_3)$. The first light receiving diffraction grating 41 is designed so that the conversion efficiency $\eta_1$ attained thereby becomes maximum when the reflected beam 26 from the information recording surface 9 is a spherical wave divergent from point $P'(0, -f \sin \psi, f \cos \psi + 2\Delta_1)$. In FIG. 13, the spacing $\delta_1$ between the center of divergence of the reflected beam 26 and the point p' is $2\Delta_1 - 2\Delta_3$ ($>0$), so the wavefront of the reflected beam 26 on the waveguide layer 2 becomes different from that of the spherical wave divergent from the point P'. Therefore, the conversion efficiency $\eta_1$ of the first light receiving diffraction grating 41 is a little lower than that in FIG. 12 ($\Delta f = \Delta_1$), and the output $E_1$ of the photo detector 20 also drops.

On the other hand, the second light receiving diffraction grating 42 is designed so that the conversion efficiency $\eta_2$ attained thereby becomes maximum when the reflected beam is a spherical wave divergent from point P''(0, $-f \sin \psi$, $f \cos \psi - 2\Delta_2$). The spacing $\delta_2$ between the center of divergence of the reflected beam and the point P'' in FIG. 13 is $2\Delta_2 + 2\Delta_3 (\delta_2 < 2\Delta_1 + 2\Delta_2)$ and thus the center of divergence approaches the point P'' as compared with that in FIG. 12. Consequently, the conversion efficiency $\eta_2$ somewhat increases as compared with that in FIG. 12, and the output $E_2$ of the photo detector 17 also increases.

Further, FIG. 14 shows the case where the focused spot 6 of the converged spherical wave 11 emitted from the diffraction grating 5 is present on the information recording surface 9 ($\Delta f = 0$), that is, the center of divergence of the reflected beam 13 is at point P(0, $-f \sin \psi$, $f \cos \psi$). At this time, the point P is approximately equidistant ($\delta_1 \simeq \delta_2$) from point P'(0, $-f \sin \psi, f \cos \psi + 2\Delta_1$) and point P''(0, $-f \sin \psi$, $f \cos \psi - 2\Delta_2$) ($\Delta_1 \simeq \Delta_2$), so the point P is the center of divergence. The difference between the wavefront of the reflected beam 13 on the thin-film waveguide layer 2 and that of the spherical wave divergent from point P' becomes almost equal to the difference between the wavefront of the reflected beam 13 and that of the spherical wave divergent from the point p''. Consequently, the conversion efficiency $\eta_1$ to the guided beam 19 and the conversion efficiency $\eta_2$, to the guided beam 15 become almost equal, and the outputs $E_1$ and $E_2$ of the light receiving elements 20 and 17 are also almost equal.

Figure 15A:
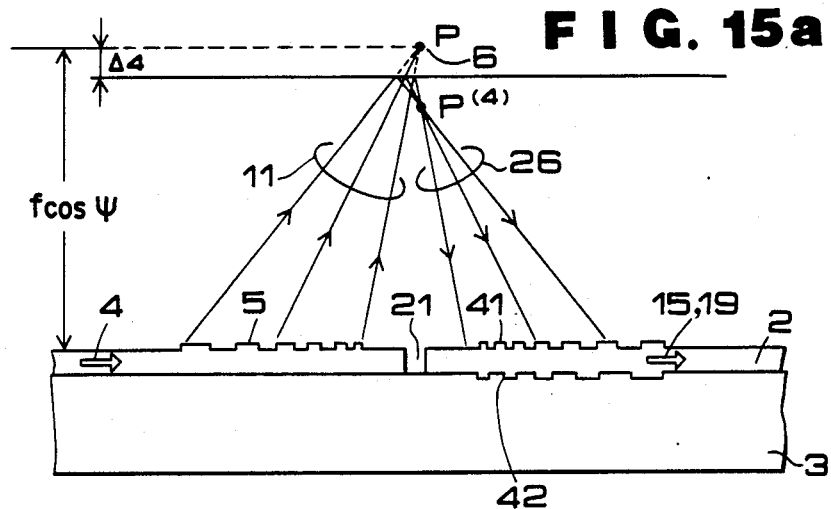
Figure 15B:
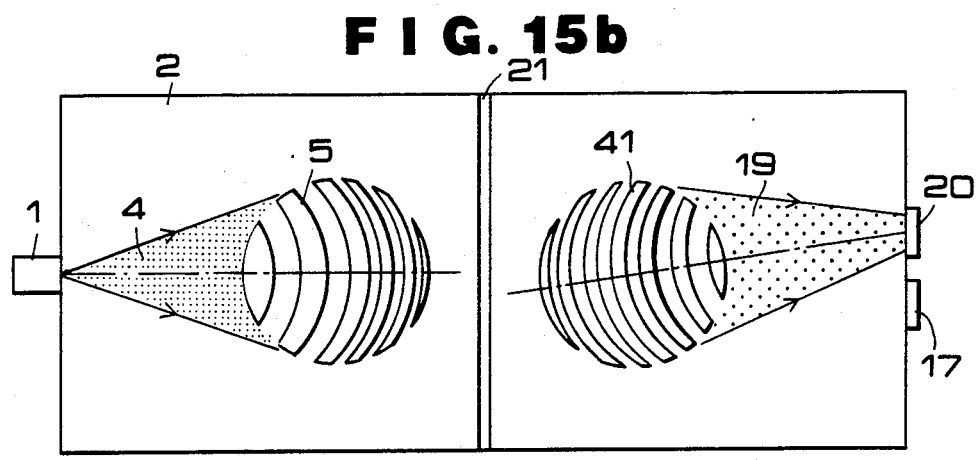
Figure 15C:
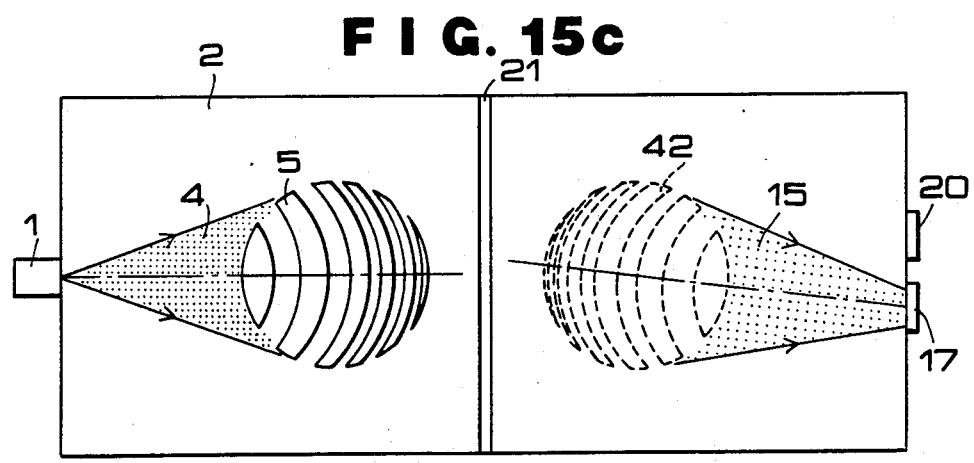

FIG. 15 shows the case where the information recording surface 9 is further spaced ($\Delta f = -\Delta_4$) below the focused spot 6 by $\Delta_4 (0 < \Delta_4 < \Delta_2)$, in this case, the center of reflection of the reflected beam 26 is at $P^{(4)}(0, -f \sin \psi, f \cos \psi - 2\Delta_4)$) and the spacing $\delta_1$ between the center of divergence and the point P'(0, $-f \sin \psi, f \cos \psi + 2\Delta_1$) is $2\Delta_1 + 2\Delta_4$ and thus becomes larger than that in FIG. 14, while the spacing $\delta_2$ between the divergence center and the point P''(0, $-f \sin \psi$, $f \cos \psi - 2\Delta_2$) is $2\Delta_2 - 2\Delta_4$ and thus becomes smaller than that in FIG. 14. consequently, the conversion efficiency $\eta_1$ attained by the first light receiving diffraction grating 41 becomes lower, while the conversion efficiency $\eta_2$ attained by the second light receiving diffraction grating 42 increases.

Figure 16A:
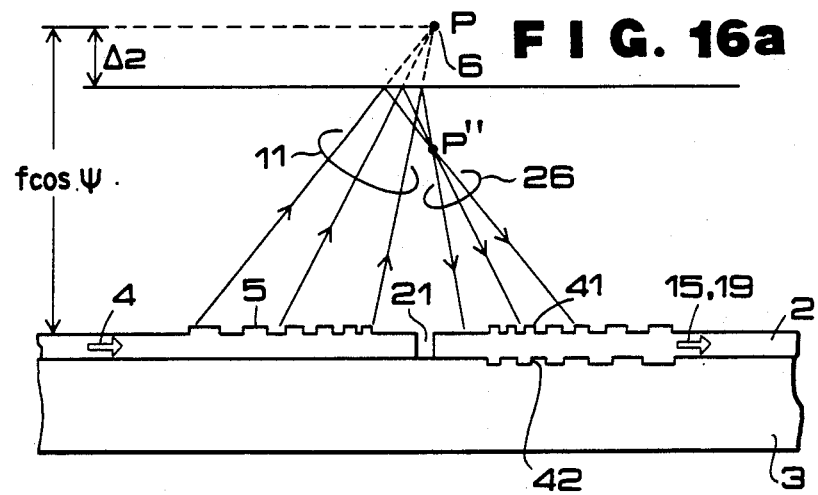
Figure 16B:
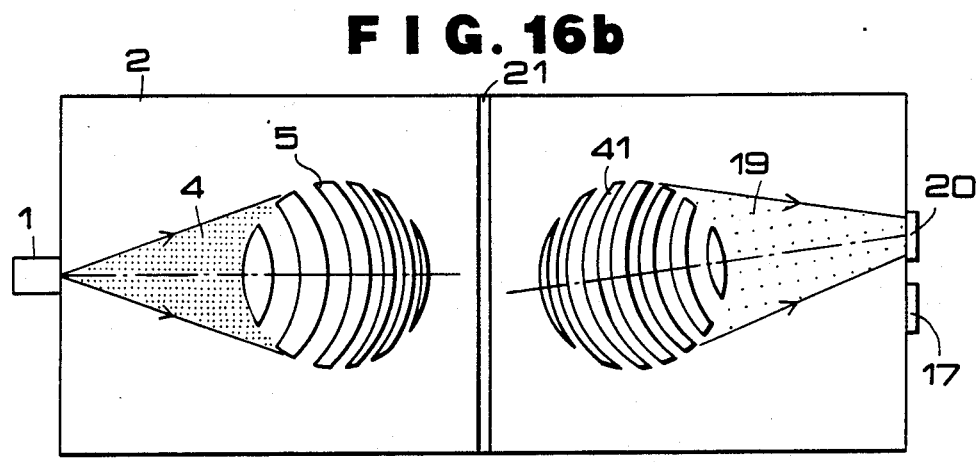
Figure 16C:
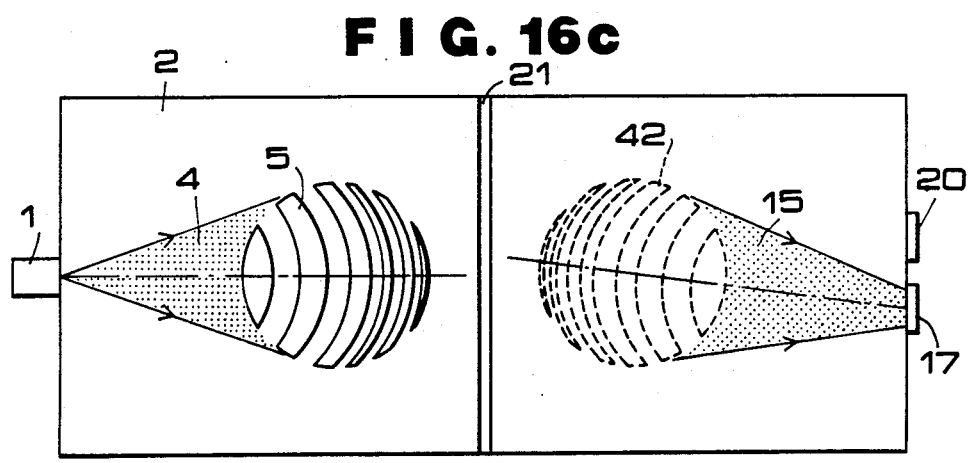

An explanation will now be made with reference to FIG. 16 about the case ($\Delta f = -\Delta_2$) where the information recording surface 9 is spaced below the focused spot 6 by $\Delta_2$. In this case, the center of reflection of the reflected light beam is at P'' and the spacing $\delta_1$ between the center of divergence and the point P' is $2\Delta_1 + 2\Delta_2$ and thus larger than that in FIG. 15, so that the conversion efficiency $\eta_1$ attained by the first light receiving diffraction grating 41 further decreases. On the other hand, the spacing $\delta_2$ between the divergence center and the point P'' becomes zero, so the conversion efficiency $\eta_2$ becomes maximum as previously explained in connection with FIG. 11.

Figure 17:
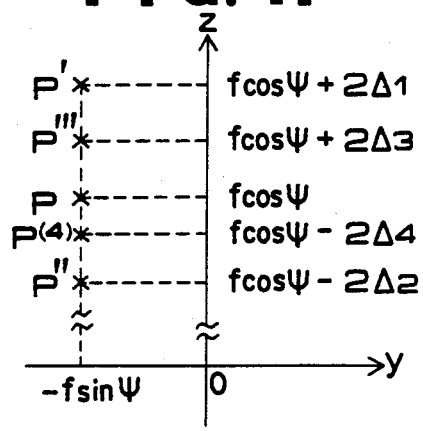
FIG. 17 is a graph showing positions of divergent centers of reflected light beams in the state shown in FIGS. 12-16.
Figure 18A:
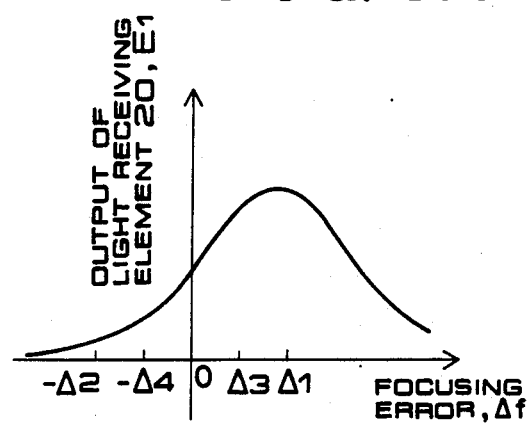
FIGS. 18(a) and (b) are graphs showing relations between focused spot deviations and photo detector outputs.
Figure 18B:
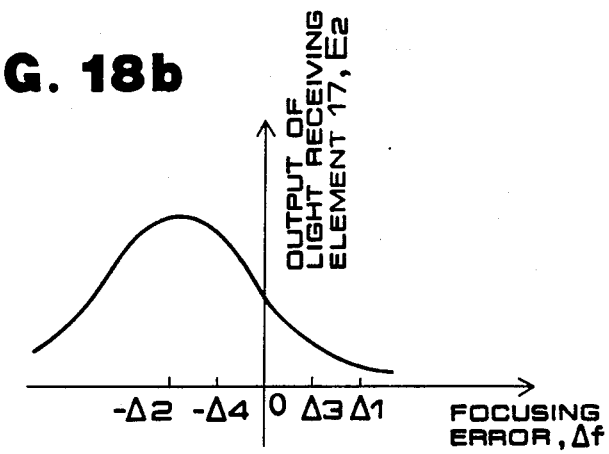
Figure 19:
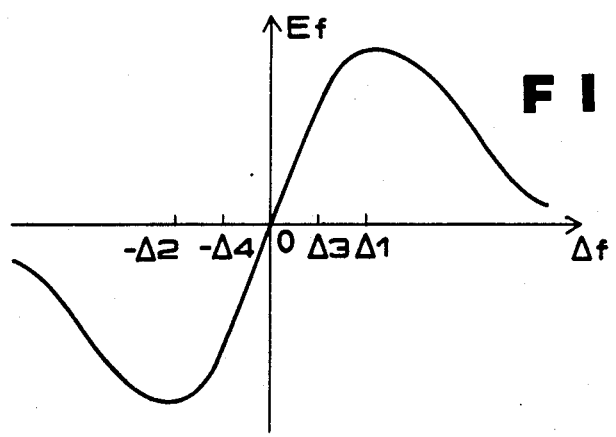
FIG. 19 is a graph showing a characteristic of a differential output of two photo detectors.
Figure 20:
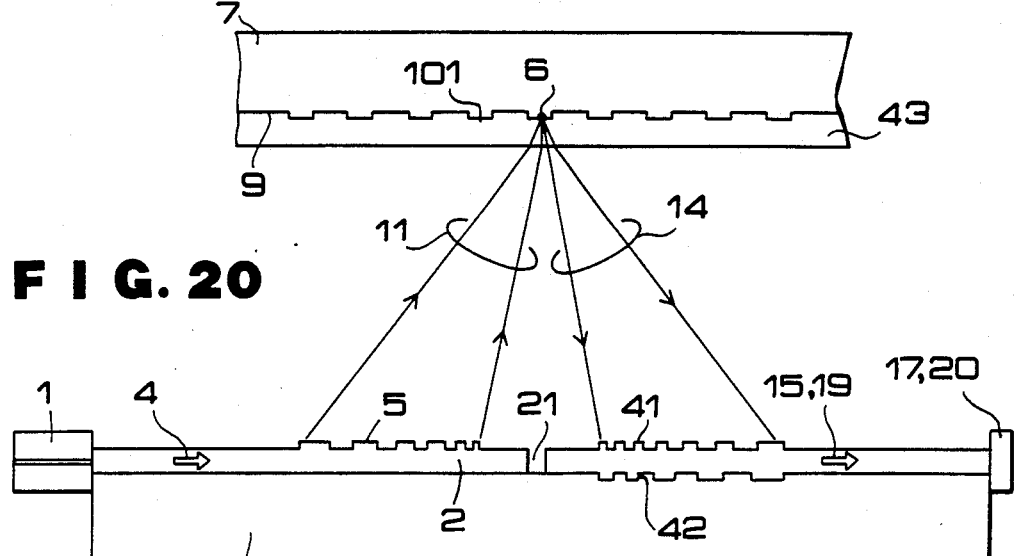
FIG. 20 is a side view similar to FIG. 11, in which an optical disc having a transparent protective layer is used.

FIG. 17 shows positions of the divergence centers of the reflected light beams used in the explanations of FIGS. 12 to 16. FIGS. 18(a) and (b) show outputs of the photo detectors 17 and 20 relative to the focusing error $\Delta f$. By taking a difference between these two outputs there can be obtained such a focusing error signal $E_f$ as shown in FIG. 19.

Although in the above embodiment the information recording surface 9 is present on the surface of the information recording medium 7, it is apparent that the same focusing error detecting device can be constituted even where the information recording surface 9 is covered with a transparent protective layer 43.

Figure 21A:
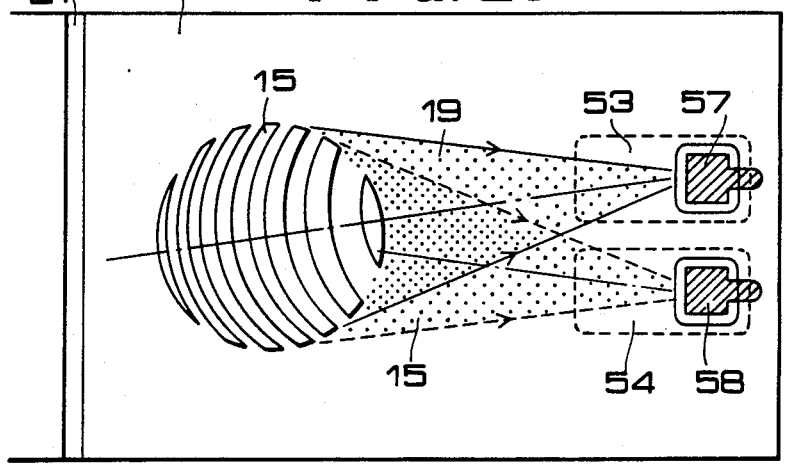
FIG. 21(a) is a plan view showing a part of a focusing error detecting device according to a further embodiment of the present invention and FIG. 21(b) is a sectional view thereof.
Figure 21B:
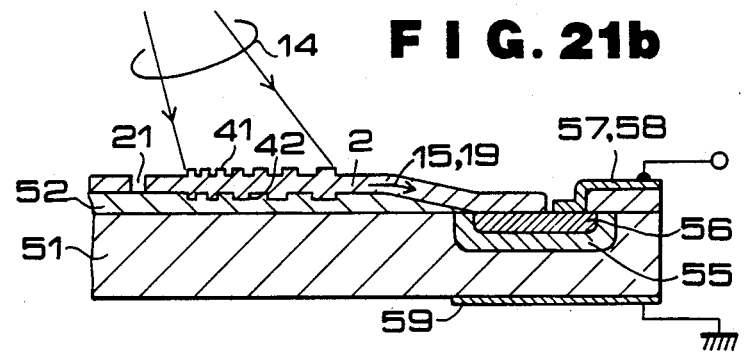

Moreover, although in the above embodiment the bisplit photo detector is attached to an end face of the thin-film waveguide layer, it may be disposed in the waveguide layer as shown in FIGS. 21(a) and (b). In order to integrate the photo detector with the waveguide layer, it is suitable to use a semiconductor material such as Si or GaAs as the substrate material. In this connection, FIGS. 21(a) and (b) show an example in which a PiN photodiode as a photo detector is integrated using an n-Si substrate. In the figures, the numeral 51 denotes an n-Si substrate, numeral 52 denotes an $SiO_2$, layer, numeral 2 denotes a waveguide layer formed by a thin-film, numerals 53 and 54 denote PiN photodiodes, numeral 55 denotes an i layer, numeral 56 denotes a P layer, and numerals 57, 58 and 59 denote electrodes.

Figure 22A:
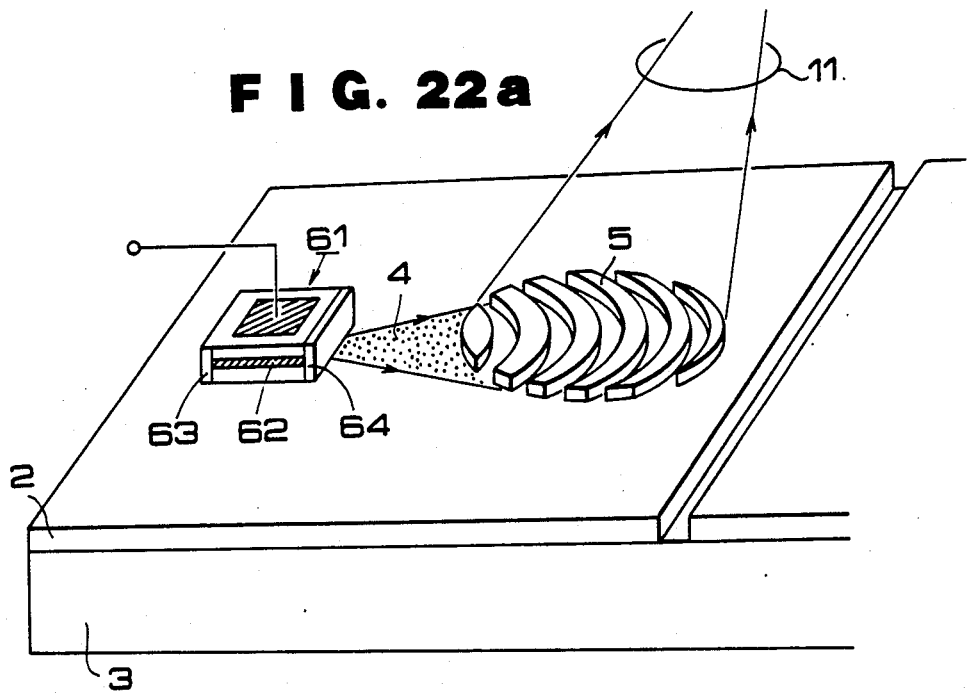
FIG. 22(a) is a plan view showing a part of a still another focusing error detecting device according to the present invention and FIG. 22(b) is a sectional view thereof.
Figure 22B:
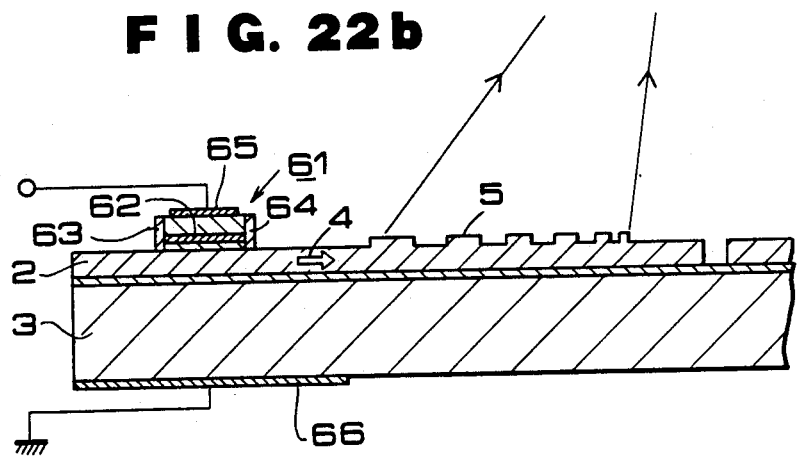

Further, although in the above embodiment the semiconductor laser 1 is attached to an end face of the thin-film waveguide layer, the semiconductor laser itself may be integrated on the substrate together with the diffraction gratings and photo detector. FIGS. 22(a) and (b) show an example in which an integrated twin-guide laser: LTG laser 61 is provided on the thin-film waveguide layer 2, in which the numeral 62 denotes an active layer, numerals 63 and 64 denote mirrors and numerals 65 and 66 denote electrodes. Laser beam generated in the active layer 62 is conducted to the waveguide layer 2 by distribution coupling and becomes a guided beam 4. As to ITG laser, reports have been made, for example, in Y. Suematsu et al., "A Multi-Hetero-AlGa, As Laser With Integrated Twin Guide", Proceedings of the IEEE, p. 208 (Jan. 1975).

According to the present invention, as set forth hereinabove, a reflected light beam from an information recording surface is converted to a guided beam at a maximum conversion efficiency by one of two light receiving diffraction gratings provided on a thin-film waveguide layer, according to a vertical position of a focused spot of light beam focused by a focusing diffraction grating relative to the information recording surface, and on the basis of the said guided beam there is performed a focusing error detection by means of a photo detector provided in the waveguide layer. Consequently, it is possible to attain reduction in size and thickness of an optical head, and it becomes completely unnecessary to adjust the position of light receiving elements.

What is claimed is:

1. A focusing error detecting device in a head assembly for an optical disc, including optical waveguides formed by a thin film for conduction of light emitted from a light source; a focusing diffraction grating provided on said thin-film waveguide layer for directing the light advancing through the waveguide layer toward an information recording surface of the optical disc and focusing it on said information recording surface; first and second light receiving diffraction gratings for conducting the light reflected by said information recording surface again into said thin-film waveguide layer; a first photo detector which receives the light introduced into said thin-film waveguide layer through said first light receiving diffraction grating and produces a first electric signal proportional to the intensity of the light; and a second photo detector which receives the light introduced into said thin-film waveguide layer through said second light receiving diffraction grating and produces a second electric signal proportional to the intensity of the light, said first light receiving diffraction grating having an optical characteristic that the conversion efficiency to a guided beam becomes maximum when a focused spot of the light focused by said focusing diffraction grating is in a position farther than said information recording surface, and said second light receiving diffraction grating having an optical characteristic that the conversion efficiency to a guided beam becomes maximum when said focused spot is in a position nearer than said information recording surface.

2. The device of claim 1, wherein said first and second light receiving diffraction gratings are formed on one surface of said thin-film waveguide layer.

3. The device of claim 1, wherein said first and second light receiving diffraction gratings are formed on both surfaces of said thin-film waveguide layer.

4. The device of claim 1, wherein said first and second light receiving diffraction gratings are relief type diffraction gratings.

5. The device of claim 1, wherein said first and second light receiving diffraction gratings are formed in said thin-film waveguide layer by a refractive index distribution technique.

6. The device of claim 1, further including a substrate for supporting said thin-film waveguide layer.

7. The device of claim 6, wherein at least one of said first and second light receiving diffraction gratings is provided at an interface of said thin-film waveguide layer and said substrate.

8. The device of claim 6, wherein said substrate is formed of a semiconductor material such as Si or GaAs.

9. The device of claim 3, wherein said photo detectors are each constituted by a photodiode integrated in said substrate.

10. The device of claim 8, wherein said light source is an integrated twin-guide laser.

11. The device of claim 1, wherein said light source is mounted in contact with one end face of said thin-film waveguide layer.

12. The device of claim 1, wherein said photo detectors are attached to one end face of said thin-film waveguide layer.

13. The device of claim 2, wherein said first and second light receiving diffraction gratings are relief type diffraction gratings.

14. The device of claim 3, wherein said first and second light receiving diffraction gratings are relief type diffraction gratings.

* * * * *

UNITED STATES PATENT AND TRADEMARK OFFICE
CERTIFICATE OF CORRECTION

PATENT NO. : 4,672,187
DATED : June 9, 1987
INVENTOR(S) : Teruo Fujita et al.

It is certified that error appears in the above-identified patent and that said Letters Patent is hereby corrected as shown below:

Column 5, lines 26-27, cancel "by substituted" and insert --from equation (3) by using equation (2) in which--;

line 27, after "$-\Delta_1$" insert --is substituted--.

Column 7, line 27, "recOrding" should be --recording--.

Column 8, line 30, the parenthesis ")" (first occurrence), should be --(--.

Column 9, line 40, cancel ")" (second occurrence);

line 41, "divcrgence" should be --divergence--.

Signed and Sealed this

Ninth Day of February, 1988

Attest:

DONALD J. QUIGG

*Attesting Officer*   *Commissioner of Patents and Trademarks*